Oct. 22, 1968    C. J. CORNILS ET AL    3,406,716

DISTRIBUTION WEIR FOR FALLING-FILM EVAPORATORS

Filed June 13, 1966

INVENTOR.
CHRISTIE J. CORNILS
CHARLES R. STAADT
BY
ATTORNEYS

United States Patent Office 3,406,716
Patented Oct. 22, 1968

3,406,716
DISTRIBUTION WEIR FOR FALLING-FILM
EVAPORATORS
Christie J. Cornils, Lakewood, and Charles R. Staadt,
Aurora, Colo., assignors to Stearns-Roger Corporation,
Denver, Colo., a corporation of Colorado
Filed June 13, 1966, Ser. No. 556,966
14 Claims. (Cl. 137—590)

This invention relates to falling-film evaporators and, more specifically, to a novel and improved tube design therefor.

In copending application Ser. No. 546,278, now U.S. Patent No. 3,322,648, which is owned by the assignee of this application, a multiple-effect falling-film evaporator is disclosed wherein the incoming vaporizable liquid from a preheater or preceding effect is discharged into an annular reservoir surrounding the upper projecting ends of the evaporator tubes where a portion thereof instantly flashes and the remaining liquid fraction builds up in said reservoir until it reaches a level at which it begins to overflow the toothed upper edges of said tubes and flow on down the inside thereof in heat-exchange relation to the hot vapors impinging against their outside surfaces. The many advantages of such an evaporator design are clearly set forth in said copending application and the present application is directed to a further improvement, namely, a specially-designed distribution weir for the top of the evaporator tubes which produces several noteworthy advantages.

These distribution weirs are, by no means, limited for use in falling-film evaporators of the specific design disclosed in the copending application above-identified, but rather, are applicable to many other designs and, when used therewith, would bring about significant improvement in their operation. Nevertheless, assignee's copending application is of interest in showing one of the structural environments wherein the instant invention can be used, and has been used, with excellent results.

The overall efficiency of a vertical-tube falling-film evaporator is, as one might expect, dependent to a large measure on the design of the tubes and the way the fluid flows therethrough. There are a number of significant deficiencies in the prior art tube designs which contribute materially to their relatively poor performance.

Probably the major shortcoming of the prior art evaporator tube designs is the use of those in which the fluid is introduced by allowing it to flow over the top edge thereof or through drilled holes in a header. When this occurs, some of the fluid will drop through the center of the tube and out the bottom without ever coming into intimate contact with the primary heat-exchange surface, namely, the tube wall. Fluid passing down the center of the tube also blocks the flow of vapors, some of which are produced instantaneously by flashing upon introduction of the fluid into the lower-pressured environment of the evaporator while the remainder are generated within the tubes themselves. This so-called "flooding" fails to produce the desired thin film of fluid on the inside tube walls that is vital to effective heat transfer, the dry tube walls being notoriously inefficient to transfer heat to the vapor. Also, as the fluid rushes into the tubes, some of it may break up into a spray which, once again, lacks the necessary heat transfer characteristics.

Distribution of the fluid equally among the several tubes is another problem of considerable significance. Evaporators employing horizontally-cut tubes, whether flush with the top apertured plate or header of the tube sheet or projecting a distance thereabove, require that all such surfaces be in the same horizontal plane, otherwise, the shorter ones will take more than their share of fluid and the longer ones may remain almost completely dry.

Ideally, the tube design should be such that all tubes receive their proportionate share of liquid. It should enter the tubes and remain on the inside surface thereof as a thin substantially continuous film leaving the center unobstructed for the unrestricted flow of both flashed and generated vapors. Any spray produced should, if possible, be directed against the tube wall and coalesced once again into a continuous fluid film. Finally, to insure an even continuous film coating the inside tube surfaces, it would be advantageous to introduce the fluid so as to induce a spiralling motion thus preventing the formation of individual "rivulets" of liquid that may leave dry areas therebetween.

It has now been found in accordance with the teaching of the instant invention that these and other desirable ends can, in fact, be achieved through the use of a novel tube extension slotted in such a manner that the incoming fluid is directed substantially tangentially against the inside tube wall where it flows downwardly in an ever-lengthening spiral to produce a thin continuous film having excellent heat-transfer potential. The flow rate of the incoming fluid is balanced with the carrying capacity of the weirs such that the liquid level never rises above the top of the tubes to produce flooding. The shape of the indentation in the tube wall adjacent the throat of the slot is such that the fluid passing thereover gradually changes direction and minimizes spray production. The tangential flow thus produced has the effect of directing any spray against the inside tube surface where it coalesces and enters the film.

Most important, however, is the fact that all of the tubes are insured of receiving approximately their proportionate share of fluid. Also, the interior surfaces of the tube are thoroughly wetted with the thin film leaving the center open to carry both the vapors produced by flashing as the liquid first enters the reduced pressure environment and those generated within the tubes as the film vaporizes.

It is, therefore, the principal object of the present invention to provide a novel and improved distribution weir for falling-film evaporator tubes.

A second object of the invention herein disclosed and claimed is the provision of a specially-designed evaporator tube that causes the liquid to flow therethrough under turbulent conditions in the form of a thin continuous film that is ideally suited to maximize heat transfer while minimizing boundary-layer resistance, over-concentration due to excessive evaporation along with the resulting scale deposits that inhibit heat transfer, and spray production.

Another object is to provide an evaporator tube weir that produces nearly an optimum liquid and vapor phase relationship within the tubes, the liquid essentially being confined to the interior surfaces whereas the vapor occupies the center.

Still another objective of the invention forming the subject matter hereof is the provision of a falling-film evaporator tube weir that functions in close cooperation with the process vapors that form the heat-exchange medium to effectively increase the temperature potential available for driving the heat transfer up to close to its theoretical maximum while, at the same time, permitting evaporation to take place throughout the length of the tubes at a relatively low temperature.

An additional object is to provide a distribution weir that can either be formed integral with the evaporator tube or, preferably, as a detachable extension thereof.

Further objects are the provision of an evaporator tube weir that is simple, efficient, inexpensive, easy to install, compact, lightweight, versatile, and adaptable for use on many existing types and designs of falling-film evaporators.

Other objects will be in part apparent and in part pointed out specifically hereinafter in connection with the description of the drawings that follows, and in which.

Before proceeding with the detailed description of the weir, it should, perhaps, be pointed out that while the drawings and accompanying descriptive material of the instant application will, for the most part, be confined to a detachable weir-forming extension adapted for insertion into a conventional evaporator tube, it is to be specifically understood that the invention contemplated hereby includes formation of such a weir as an integral part of the evaporator tube itself. As an addition to existing equipment, there is no doubt but that the insert-type weir has much to recommend it over forming same as an integral extension of the main evaporator tube for the obvious reason that the evaporator would have to be completely disassembled at great expense to accomplish the required modification. Even in the case of a new installation, the inserts are probably the most practical because they can be replaced if damaged and, in addition, it is possible to fabricate them from lighter-gauge less-expensive stock or, for that matter, a different material altogether such as, for example, some type of plastic in the form of tubing or a custom-molded shape. Thus, the drawings illustrate the preferred form of the weir, namely, as a detachable extension of a conventional evaporator tube.

Figure 1:
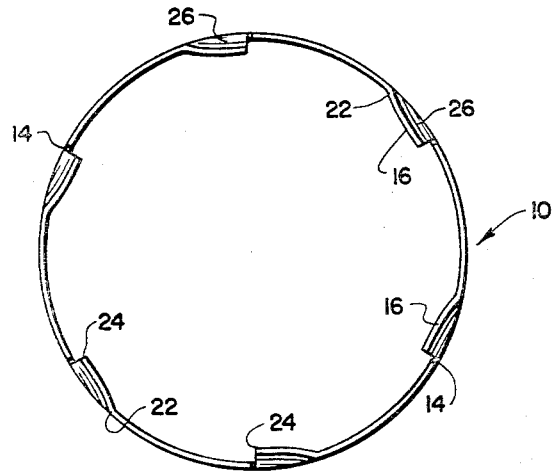
FIGURE 1 is a top plan view of the evaporator-tube weir.
Figure 3:
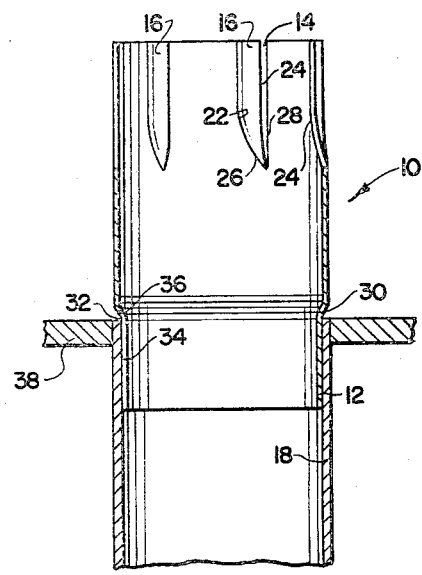
FIGURE 3 is a fragmentary diametrical section to a reduced scale showing the weir removably mounted in the upper end of a conventional falling-film evaporator tube.
Figure 2:
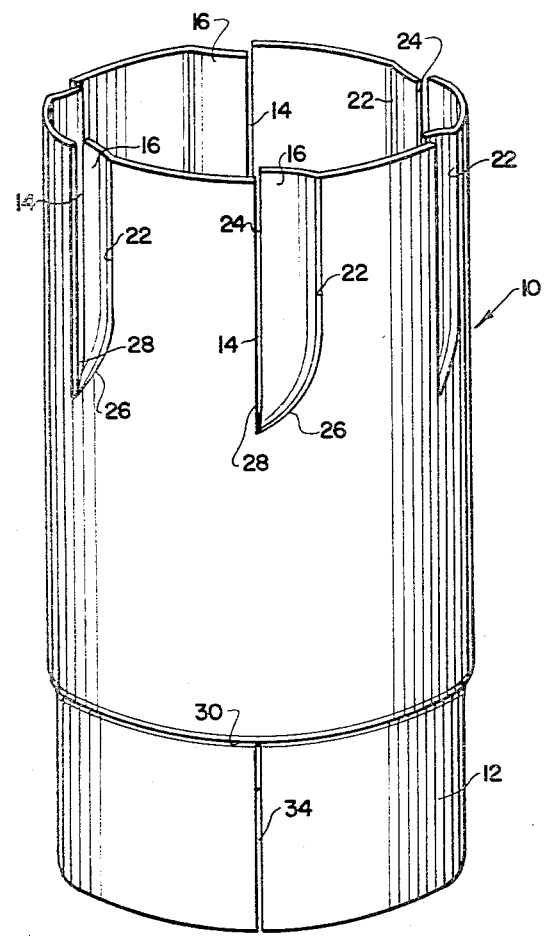
FIGURE 2 is a perspective view of the weir as it would appear from a position to one side and slightly above same.
Figure 4:
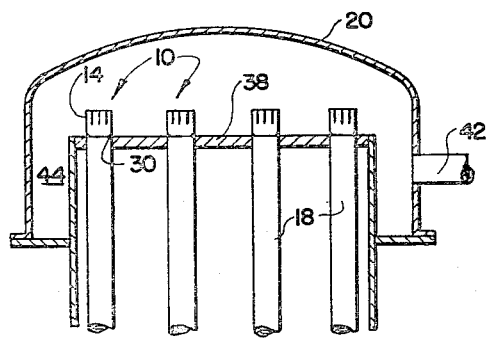
FIGURE 4 is a fragmentary diametrical section to a further reduced scale showing the upper portion of one type of falling-film evaporator equipped with the weirs of the present invention.

Directing the attention now to the drawings for a detailed description of the instant invention and, initially, to FIGURES 1–3, inclusive, for this purpose, the weir, which has been broadly designated by reference numeral 10, will be seen to comprise a short tubular element having a section 12 of reduced diameter at the lower end thereof and one or more slots 14 in its upper edge bordered on one side by incurved louvres 16. The tubular elements are, as shown, essentially cylindrical for the simple reason that the evaporator tubes 18 are of this same shape; however, it is obvious that they would function in much the same way with an oval or even polygonal cross section even though there would seem to be little advantage in making them other than circular. The louvres 16 are partially freed from the tube walls by the slots 14 therein which extend from the top edge to a point well down toward the middle thereof. In the particular form illustrated, these slots are essentially vertical and parallel to the axis of the tube even though there would be no particular disadvantage to having them inclined. While one such slot would function to admit fluid to the interior of the tube and might, under certain conditions, be all that is needed, ordinarily several such slots would be required to handle each tube's proportionate share of fluid entering the evaporator 20 (FIGURE 4). In order to distribute the incoming fluid equally around the entire inner cylindrical surface of the tube, these slots should be arranged in substantially equi-angularly-spaced relation to one another.

A number of factors, of course, influence the quantity of fluid each such weir can handle during a given time interval without overflowing such as, for example, the number of slots, their length and width. Once the design and operating characteristics of a given evaporator are known, it becomes a relatively simple matter to select a combination from among these variable that will answer the needs of the particular system. Other characteristics like the physical properties of the liquid, etc., may also influence the design of the weir to some extent, yet, they present no problems that one of ordinary skill in evaporator design would not be able to cope with rather easily. The louvred construction of the weir places a practical limit on the number thereof that can conveniently be placed around the tube and still retain their desired shape and function. It has been found, for instance, that a 1½″ O.D. weir can accommodate a maximum of about six such louvres, one additional louvre for each half inch increase in outside diameter up to about 2½″, and a 3″ one approximately ten louvres. Normally, one might select a weir design such that the fluid level in the top of the evaporator would remain about half way up on the slot under ordinary flow conditions. Even this criteria is subject to rather wide variation to suit the needs of a particular unit but, on the other hand, it does afford one the maximum possible opportunity to accommodate extraordinary flow conditions without flooding or shutting off the flow to the tubes entirely.

Next, with regard to the louvres 16, their design is of considerable significance in achieving optimum fluid distribution efficiency. As illustrated, the attached margin 22 thereof lies essentially parallel to its free edge 24 for a substantial portion of its length before curving gently back to the base of the slot 14. This curved section 26 performs a significant function, namely, that of gradually changing the direction of fluid flow from a primarily vertical direction to one that begins to approach horizontal so that the fluid coursing thereover will enter the throat 28 essentially tangentially and with insufficient turbulence to break up into a spray. If any spray does result, the substantial horizontal and tangential force component of the stream as it leaves the throat will cause the droplets to immediately impinge against the interior wall surface and, once again, coalesce into a cohesive film. The gentle inward curve of the louvre as viewed from above is such that the fluid leaves the free edge 24 essentially tangentially to immediately contact the cylindrical interior wall surface and begin to gravitate downwardly therealong as a thin film having an ever-lengthening spiral motion which wets the entire heat-transfer surface. Insufficient turbulence is produced in the film to create appreciable spray while, on the other hand, enough is generated to effectively prevent the formation of a so-called "boundary-layer" of hot liquid adjacent the wall to inhibit effective heat transfer. The resulting flow pattern is such that no "rivulets" of fluid separated by dry tube surfaces having marginal heat transfer value insofar as the vapors in contact therewith are concerned.

By directing the fluids against the wall tangentially in a spiralling motion, the center of the tube remains open for relatively unrestricted vapor flow. Also, since the vapor is saturated, its temperature is dependent upon the pressure within the interior of the tube. An unrestricted vapor flow path such as is left by confining the liquid phase to the tube wall prevents the undesirable localized increase in pressure between the tube ends that would occur if the tube were flooded with liquid, spray or otherwise obstructed.

Another significant advantage directly attributable to the use of the weir is the fact that they are responsible for uniform coating of the heat transfer surfaces and the resultant elimination of "hot-spotting" wherein, conceivably, an overconcentrated condition would be produced in a localized area. If this were to occur, the solubility limit of any dissolved solids would take place quite readily leaving a mineral scale on the interior tube surfaces that prevents efficient heat transfer and materially reduces the capacity of the tubes to say nothing of the maintenance problem caused thereby.

Now, while sharp corners along the attached margin of the louvre or along the bottom thereof would, undoubtedly, result in some of the desirable features of the weir being realized, they would probably be considerably diminished and excessive turbulence, spray production and even "cavitation" might easily result. It becomes important, therefore, to design the louvres with smoothly curved surfaces that redirect the fluid into essentially tangential spiralling flow without introducing excessive turbulence.

One other aspect of the slot and louvre arrangement deserves special attention and that is the narrowing of the throat 28 at the base thereof. Essentially, this produces a V-shaped notch wherein the fluids passing therethrough will attain incremental differential velocities as opposed to a purely lineal flow pattern. These differential velocities prevent the fluid from just dropping off the edge as would be the case with a wide squared-off throat; instead, the fluid at the apex of the V moves the fastest and carries a substantial horizontal force component which aids in the establishment of the highly-desirable spiralling motion.

Next, with specific reference to FIGURES 3 and 4, it will be noted that the lower section 12 of reduced diameter is separated from the louvred upper portion by a continuous annular shoulder 30 that rests atop the upper extremity 32 of the evaporator tube and limits the degree of telescopic penetration of said reduced section therein. In addition, shoulder 30 provides a convenient means for locating the throats 28 of all the tube slots in essentially the same horizontal plane thus assuring that each tube receives its proportionate share of fluid. Furthermore, shoulder 30 cooperates with slot 34 in the section 12 at the base of the tube to leave a drain hole 36 (FIGURE 3) extending above the level of header 38 through which the fluids trapped between the latter and the bottom of the slots 14 may drain. For this reason, slot 34 must extend into shoulder 30 instead of terminating therebeneath. The prime function of slot 34 is, of course, to permit limited contraction of section 12 so that the latter can be slipped down inside the evaporator tube 18 as shown most clearly in FIGURE 3.

An examination of FIGURE 3 will quickly reveal the fact that other well-known types of stops other than shoulder 30 could easily be employed for the purpose of limiting the penetration of the weir into the evaporator tube and such other stops could be used with tubes having a constant outside diameter corresponding to the inside diameter of the evaporator tube 18. Nevertheless, there are certain advantages to providing the reduced section 12 in terms of simplicity of installation, elimination of a tilted relation between the tube and weir and the drain feature above-noted. In fact, the weir could be welded directly to the top of the evaporator tube and eliminate the telescoping feature altogether, but, it would hardly seem worth the time and effort when the illustrated construction does the same job and much more easily.

Finally, in FIGURE 4 the weirs 10 are shown located atop the evaporator tubes projecting above header 38 into the pressure-tight dome 40 into which the fluid is first introduced through conduit 42. The fluid builds up in annular reservoir 44 surrounding the upper end of the tube bundle until it eventually covers the header and rises to a level where it can flow past the louvres and into the slots 14. Once this condition is attained, the fluid level is maintained at a point intermediate the extremities of these slots while the evaporator is in operation.

Having thus described the several useful and novel features of the distributing weir of the present invention, it will be seen that the many worthwhile objects for which it was designed have been achieved. While but a single specific embodiment of the invention is all that has been specifically illustrated, we realize that certain changes and modifications therein may well occur to those skilled in the art within the broad teaching hereof; hence, it is our intention that the scope of protection afforded hereby shall be limited only insofar as said limitations are specifically set forth in the appended claims.

What is claimed is:

1. A weir for use in falling-film evaporators as the means for transferring the fluid-phase constituents of the feed to the interior heat-exchange surface of each evaporator tube from the reservoir located atop the latter, which comprises: an upstanding tubular extension of each evaporator tube containing at least one upwardly-ranging slot in the wall thereof and an inturned louvre corresponding to each slot bordering same on one side thereof, said louvre being shaped to accept fluid from the reservoir and direct same through the slot in substantially tangential relation to the interior tube surface immediately adjacent said slot.

2. The weir as set forth in claim 1 in which: each tubular extension includes at least two slots arranged in substantially equi-angularly-spaced relation to one another.

3. The weir as set forth in claim 2 in which: the slots are substantially parallel to one another.

4. The weir as set forth in claim 1 in which: the slots are essentially vertical.

5. The weir as set forth in claim 1 in which: the tubular extensions are open at the top and the slots extend all the way to the top margin thereof.

6. The weir as set forth in claim 5 in which: the lower ends of the slots terminate in spaced relation above the bottom of the reservoir so as to maintain a substantial head of fluid in the latter.

7. The weir as set forth in claim 1 in which: the tubular extension includes at least two slots and the louvres corresponding thereto are each located on the same side of their respective slots so as to cause the fluid streams entering the tube to all flow the same direction.

8. The weir as set forth in claim 1 in which: each louvre is formed integral with the wall of the tubular extension so as to define a common margin adjoining said wall and a free edge bordering the slot, in which the portion of said louvre lying adjacent the common margin thereof is curved inwardly, and in which the portion of said louvre extending from said inwardly curved portion to the free edge thereof is offset inside of the cylindrical interior surface of the tubular extension.

9. The weir as set forth in claim 8 in which: the portion of the louvre positioned adjacent the lower end of the notch is generally cup-shaped and cooperates with the adjoining walls of the tubular extension to define a substantially V-shaped throat at the base of said notch.

10. The weir as set forth in claim 1 in which: the slot narrows and forms an essentially V-shaped notch at the lower end thereof.

11. The weir as set forth in claim 1 in which: the portion of the louvre lying adjacent the lower end of the slot is curved to produce an essentially quarter-spherical surface adapted to impart to the fluid entering the tubular extension in this area a substantial horizontal force component that when combined with gravitational forces will cause said fluid to flow down along the inside surface of the evaporator tube with a spiralling motion.

12. The weir as set forth in claim 1 in which: the tubular extension includes a drain opening positioned and adapted to continue to pass fluid into the evaporator tube when the level thereof has dropped beneath the lower end of the slots.

13. The weir as set forth in claim 1 in which: the interior diameter of the tubular extension is substantially the same as the evaporator tubes, in which said tubular extension includes a section of reduced diameter at the lower extremity thereof sized to telescope in said evaporator tube, and in which an annular shoulder separates the larger and smaller-diametered sections of said tubular extension, said shoulder being adapted to cooperate with the upper end of the evaporator tube and limit the extent to which said extension may be inserted therein.

14. The weir as set forth in claim 13 in which: the section of reduced diameter at the lower end of the tubular extension includes a vertically-disposed slit extending from the lower margin thereof up into the annular shoulder, said slit enabling the reduced section to be contracted slightly for insertion into the evaporator tube, and the portion of said slit within the shoulder cooperating with said evaporator tube to define a drain opening.

References Cited

UNITED STATES PATENTS

| 1,149,865 | 8/1915 | Smith | 137—590 |
| 2,210,118 | 8/1940 | Duncan | 137—590 |
| 2,295,088 | 9/1942 | Kleucker | 62—527 |
| 2,359,024 | 9/1944 | DeLancey | 137—590 |
| 2,408,480 | 10/1946 | Reid | 62—527 |
| 2,701,028 | 2/1955 | Eilenberger | 137—577 |

M. CARY NELSON, *Primary Examiner.*

W. R. CLINE, *Assistant Examiner.*